United States Patent
Kamimura et al.

(10) Patent No.: US 7,612,460 B2
(45) Date of Patent: Nov. 3, 2009

(54) ENGINE-DRIVEN POWER GENERATOR

(75) Inventors: Kenji Kamimura, Saitama (JP); Ryuji Sakurai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 188 days.

(21) Appl. No.: 11/806,329

(22) Filed: May 31, 2007

(65) Prior Publication Data

US 2007/0278801 A1    Dec. 6, 2007

(30) Foreign Application Priority Data

May 31, 2006   (JP)   ............... 2006-151534

(51) Int. Cl.
  *H02P 9/04*   (2006.01)
  *F02B 63/04*  (2006.01)
  *F03G 7/08*   (2006.01)
  *H02K 7/18*   (2006.01)

(52) U.S. Cl. ............. 290/40 C; 290/1 R; 123/357

(58) Field of Classification Search ......... 290/40 C, 290/1 R; 123/357
See application file for complete search history.

(56) References Cited

U.S. PATENT DOCUMENTS

| | | | | |
|---|---|---|---|---|
| 4,590,913 A * | 5/1986 | Faupel et al. | ............... | 123/502 |
| 4,641,553 A * | 2/1987 | Kobayashi | ............... | 477/47 |
| 4,708,112 A * | 11/1987 | Nanjyo et al. | ............... | 123/357 |
| 4,709,335 A * | 11/1987 | Okamoto | ............... | 701/104 |
| 4,749,944 A * | 6/1988 | Okamoto | ............... | 324/772 |
| 4,773,369 A * | 9/1988 | Kobayashi et al. | ........... | 123/357 |
| 4,926,108 A * | 5/1990 | Schooley et al. | ............... | 322/15 |
| 5,231,965 A * | 8/1993 | Muzzy | ............... | 123/325 |
| 5,413,540 A * | 5/1995 | Streib et al. | ............... | 477/43 |
| 5,468,196 A * | 11/1995 | Minowa et al. | ............... | 477/62 |
| 5,479,908 A * | 1/1996 | Grinberg et al. | ............... | 123/386 |
| 5,697,339 A * | 12/1997 | Esposito | ............... | 123/357 |
| 5,782,221 A * | 7/1998 | Woldt | ............... | 123/436 |
| 6,089,207 A * | 7/2000 | Goode et al. | ............... | 123/357 |
| 6,601,442 B1 * | 8/2003 | Decker et al. | ............... | 73/114.15 |
| 6,608,393 B2 * | 8/2003 | Anderson | ............... | 290/1 A |
| 6,969,921 B2 * | 11/2005 | Yoshimatsu | ............... | 290/1 R |
| 7,058,502 B2 * | 6/2006 | Rodgers | ............... | 701/104 |

(Continued)

FOREIGN PATENT DOCUMENTS

JP    3540152 B2   7/2004

*Primary Examiner*—Nicholas Ponomarenko
*Assistant Examiner*—Pedro J Cuevas
(74) *Attorney, Agent, or Firm*—Westerman, Hattori, Daniels & Adrian, LLP

(57) ABSTRACT

The present invention provides an engine-driven synchronous power generator that selects the operation state with respect to the load of the power generator by controlling the revolution. The electronic governor 4 includes a target revolution determining unit 10 including a storage 101 for providing a constant target engine revolution irrespective of the load current, and a map 102 for providing the target engine revolution corresponding to the load. The target revolution corresponding to the revolution of no-load operation and loaded operation is set in the map 102. The storage 101 or the map 102 is selected by operating a switch 9. A governor motor 14 is controlled so that the actual engine revolution calculated in an engine revolution calculator 7 converges to the target revolution. An automotive voltage regulator (AVR) 15 for controlling the output voltage of the power generator 1 constant irrespective of the load is provided.

6 Claims, 3 Drawing Sheets

U.S. PATENT DOCUMENTS

| | | | |
|---|---|---|---|
| 7,069,673 B2* | 7/2006 | Kagoshima et al. | 37/348 |
| 7,098,628 B2* | 8/2006 | Maehara et al. | 322/24 |
| 7,388,301 B2* | 6/2008 | Komiyama et al. | 290/40 C |
| 7,487,757 B2* | 2/2009 | Radovanovic et al. | 123/357 |
| 2002/0070554 A1* | 6/2002 | Anderson | 290/1 R |
| 2004/0148817 A1* | 8/2004 | Kagoshima et al. | 37/348 |
| 2005/0012337 A1* | 1/2005 | Yoshimatsu | 290/40 C |
| 2005/0114002 A1* | 5/2005 | Rodgers | 701/54 |
| 2005/0140342 A1* | 6/2005 | Maehara et al. | 322/36 |
| 2006/0000442 A1* | 1/2006 | Carlton et al. | 123/357 |

* cited by examiner

ENGINE-DRIVEN POWER GENERATOR

BACKGROUND OF THE INVENTION

1. Field of the Invention

The present invention relates to engine-driven power generators, in particular, to an engine-driven power generator of a type that uses synchronous power generator in which the operation state corresponding to the power generator load can be appropriately selected by controlling the revolution.

2. Description of the Related Art

In the engine-driven power generator of a type that drives the synchronous power generator with an engine, the engine revolution n, the output frequency f, and the number of magnetic poles P have a relationship expressed as $n=120f/P$. Therefore, the engine revolution must be maintained at a predetermined value in order to maintain the output frequency at a predetermined value. For example, when the number of magnetic poles is "2", the engine revolution must be maintained at 3000 rpm at the output frequency of 50 Hz, and the engine revolution must be maintained at 3600 rpm at the output frequency of 60 Hz.

A mechanical governor is generally used in controlling the engine revolution. The mechanical governor detects the engine revolution as centrifugal force, and opens or closes a throttle of a carburetor using a link mechanism and a spring. The mechanical governor easily produces aging change as it is mechanical, and offset adjustment, adjustment of revolution setting or the like are difficult.

Recently, an inverter type power generator is being widely used in which the output frequency of the power generator is controlled with an inverter so that the output frequency does not depend on the engine revolution, and the engine revolution is variably controlled with an electronic governor in place of the mechanical governor with respect to change in the load of the power generator (see e.g., Japanese Patent Publication No. 3540152)

However, the inverter type power generator disclosed in Japanese Patent Publication No. 3540152 has a problem in that it is less likely to become popular since the manufacturing cost is significantly high compared to the synchronous power generator.

SUMMARY OF THE INVENTION

The present invention has been made in view of the above problems, an object thereof is to provide an engine-driven power generator having a normal operation mode of stably maintaining the output frequency, and an economic operation mode enabling the selection of small output or large output operation according to the magnitude of the load in the synchronous power generator.

The first feature of this invention includes an engine-driven power generator configured by an engine and a synchronous power generator driven by the engine; the engine-driven power generator comprising: an electronic governor for controlling the revolution of the engine to a target value, the electronic governor including operation modes of a normal operation mode of maintaining the engine revolution substantially constant irrespective of the fluctuation in the load of the power generator, and an economic operation mode of increasing or decreasing the engine revolution within a predetermined allowable range according to the fluctuation in the load of the power generator; and switching means for selecting one of either the normal operation mode or the economic operation mode.

The second feature of this invention is that the engine-driven power generator further comprising: a sensor for detecting load current of the power generator; and target value determining means for determining the target value of the engine revolution according to the load current between an upper limit value and a lower limit value set within the predetermined allowable revolution range when the economic operation mode is selected.

The third feature of this invention is that one of a plurality of target revolution range is selected in the economic operation mode.

The fourth feature of this invention is further comprising an automatic voltage regulator for controlling the output voltage substantially constant irrespective of the fluctuation in the load of the power generator.

According to the present invention of a first feature, the engine revolution is maintained substantially constant in the normal operation mode, and thus the synchronous power generator is able to output the power of stable output frequency. In the economic operation mode, operation at reduced fuel consumption and low noise is possible with reduced engine revolution within the predetermined revolution range set in advance when the load of the power generator is small. Similarly, large output operation is possible with increased engine revolution within the predetermined revolution range set in advance if the load of the power generator is large.

According to the present invention of a second feature, the engine revolution fluctuates according to the magnitude of the load of the power generator during operation in the economic operation mode but is determined to be within the range of upper limit value and lower limit value of the predetermined allowable revolution, and thus the power generator performance can be effectively utilized within the allowable fluctuation range of the output frequency.

According to a third feature, the power generator performance corresponding to the load can be utilized since the revolution range is selected in consideration of the allowable frequency fluctuation range corresponding to the type of load and the like in the economic operation mode.

According to a fourth feature, power supply under stable output voltage having satisfactory follow-up performance becomes possible irrespective of the fluctuation in load.

DETAILED DESCRIPTION OF THE PREFERRED EMBODIMENTS

Figure 1:
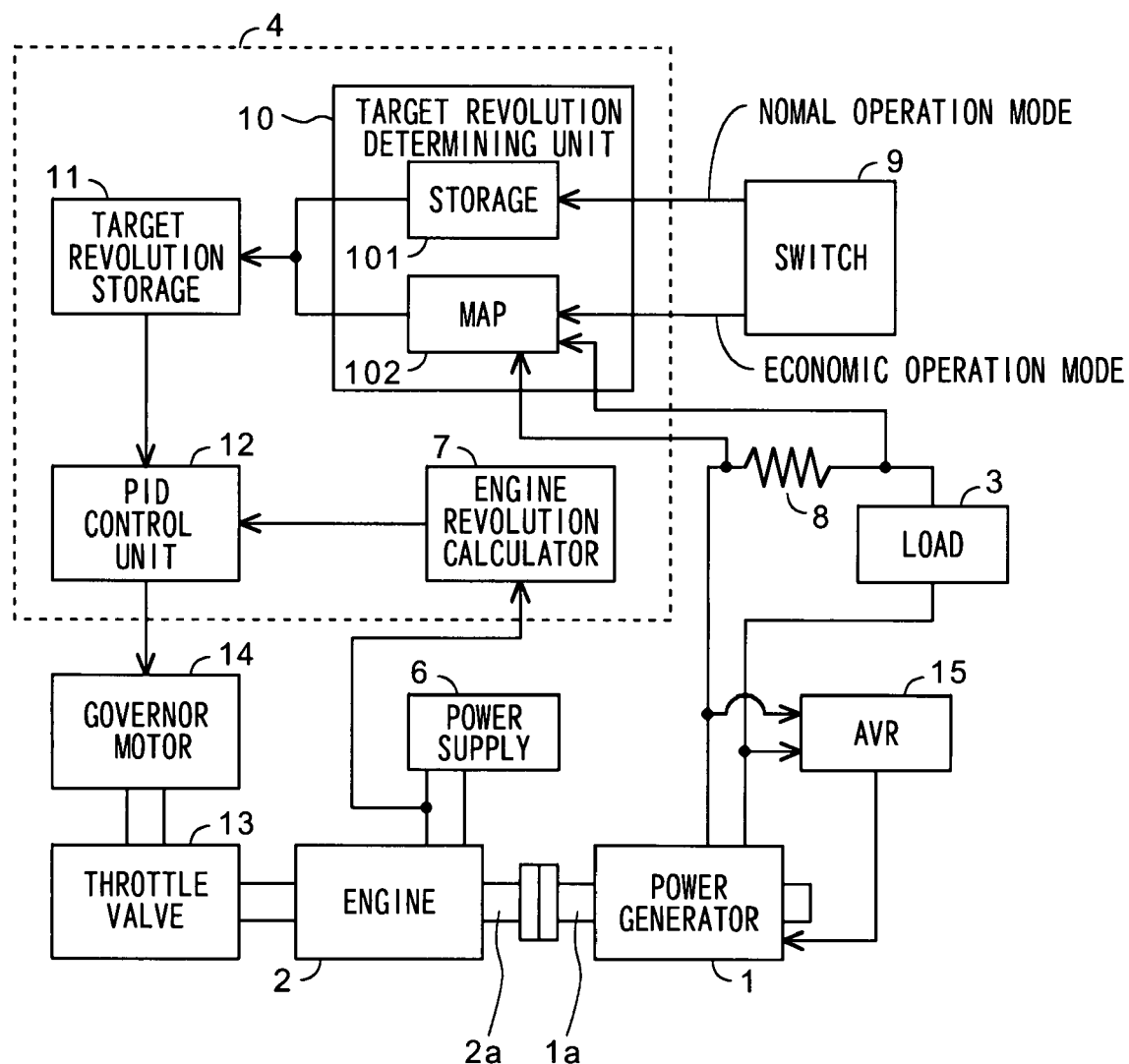
FIG. 1 is a block diagram showing a system configuration of an engine-driven power generator according to one embodiment of the present invention.

The present invention will now be described in detail with reference to the drawings. FIG. 1 is a system configuration view of an engine-driven power generator according to one embodiment of the present invention. In FIG. 1, a rotor shaft 1a of a synchronous power generator 1 is connected to an output shaft 2a of an engine 2, and the power generator 1 generates an alternating current synchronized with the rotation of the engine 2. The alternating output of the power generator 1 is connected to a load 3. The generator 1 is assumed to be used for load 3 that includes loads having versatility such as a relatively large load as in a compressor, a washer and the like, an induction load having large dependency on the output frequency, and general load including other small loads.

An electronic governor 4 is provided for controlling the revolution of the engine 2. The output of a control power supply winding of a magnet power generator mounted in a flywheel of the engine 2 is rectified in a rectifier (not shown) and connected to a power supply device 6. The power supply device 6 is charged by the output of the control power supply winding during the operation of the power generator 1. The engine revolution is calculated in an engine revolution calculating unit 7 based on the frequency of the rectified output. A CT sensor 8 detects the current flowing through the load 3, and provides the result to the electronic governor 4.

The electronic governor 4 has an operation mode (hereinafter referred to as "economic operation mode") of increasing and decreasing the target engine revolution in response to fluctuation in the load current within a predetermined allowable range, and an operation mode (hereinafter referred to as "normal operation mode") of maintaining the target engine revolution constant without increasing or decreasing irrespective of the fluctuation in the load current, and selects one of the modes according to the type of load. The normal operation mode is used especially for loads in which fluctuation in the output frequency is not preferred, that is, loads that depend on the frequency. A switch 9 is arranged as switching means for selecting the economic operation mode or the normal operation mode.

The electronic governor 4 includes a target revolution determining unit 10, and determines the target engine revolution based on the load current detected in the CT sensor 8. The target revolution determining unit 10 includes a storage 101 for storing a fixed value serving as the target engine revolution, and a map 102 for setting the target engine revolution corresponding to the load current detected in the CT sensor 8. A calculation formula for calculating the target engine revolution based on the load current may be arranged in place of the map 102.

When the normal operation mode is selected by the switch 9, the target engine revolution is read from the storage 101 of the target revolution determining unit 10 and stored in the target revolution storage 11. When the economic operation mode is selected with the switch 9, the target engine revolution corresponding to the load current is read from the map 102 of the target revolution determining unit 10 and stored in the target revolution storage 11.

A PID control unit 12 generates a governor output so that the engine revolution calculated in the engine revolution calculator 7 converges with respect to the target engine revolution read from the target revolution storage 11. The governor output is supplied to a governor motor 14 that drives a throttle valve 13 of the engine 2. The governor motor 14 preferably includes a stepping motor.

An automatic voltage regulator (hereinafter referred to as "AVR") 15 detects the output voltage of the power generator 1, and controls the current (field current) flowing through the field winding of the power generator 1 so that the detected voltage becomes a predetermined value (for example, 100 volts).

Figure 2:
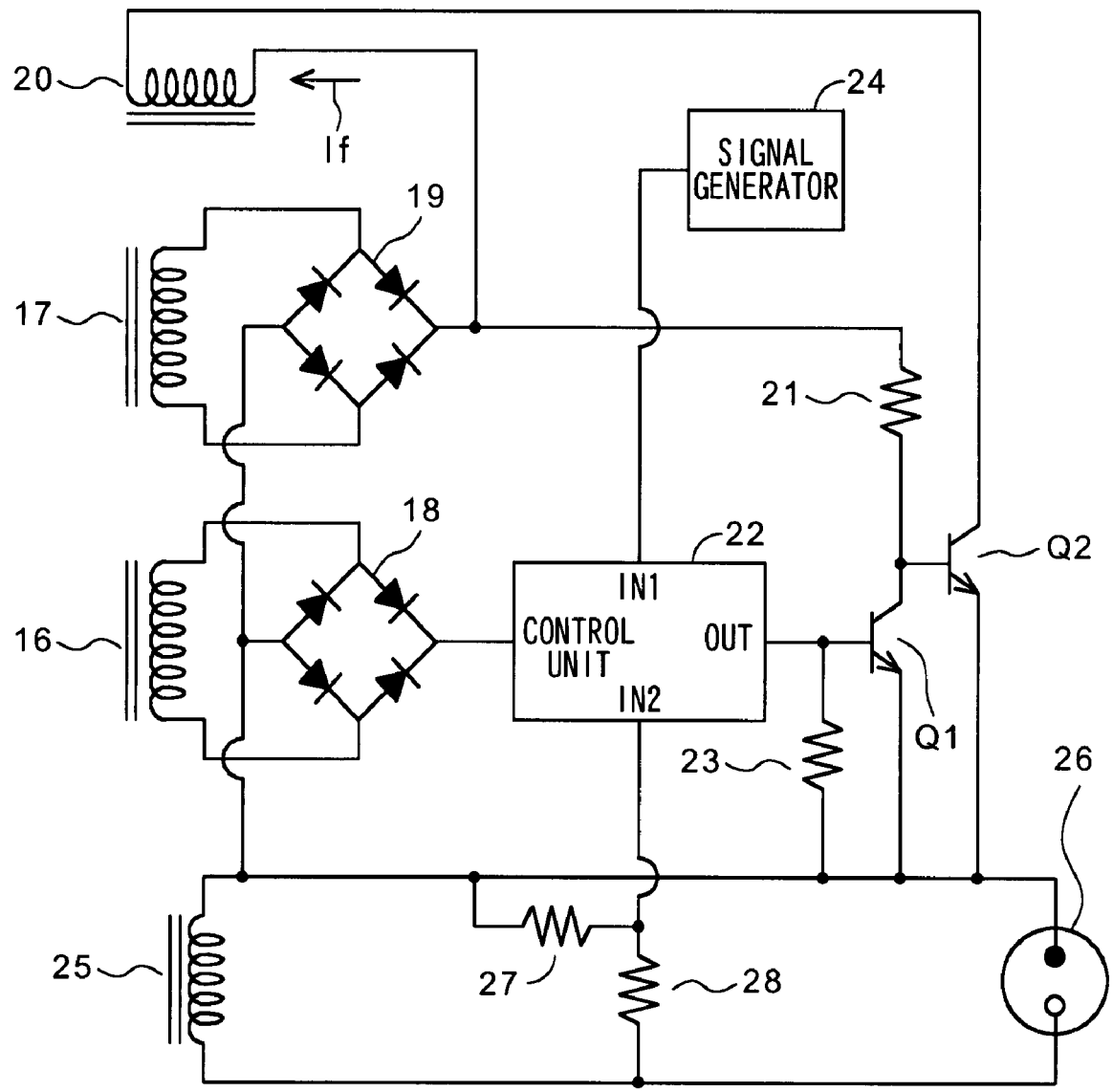
FIG. 2 is a circuit diagram showing one example of an AVR.

FIG. 2 is a circuit diagram of the main parts of the AVR 15. The control power supply winding 16 and an excitation winding 17 winded on the stator are connected to the input side of the full-wave rectifiers 18 and 19, respectively. The output side of the full-wave rectifier 19 is connected to one end of a field winding 20 winded on the rotor by way of a slip ring (not shown), and is connected to the collector of a transistor Q1 and the base of a transistor Q2 by way of a resistor 21. The other end of the field winding 20 is connected to the collector of the transistor Q2 by way of a slip ring (not shown). The output side of the full-wave rectifier 18 is connected to a control unit 22 including a microcomputer and supplies control power supply thereto. The output terminal OUT of the control unit 22 is connected to the base of the transistor Q1. A resistor 23 is connected in parallel between the base and the emitter of the transistor Q1.

A signal generator 24 generates a detection signal for one rotation of the engine by a detection coil mounted in the flywheel of the engine 2, and the detection signal is used as a reference ignition signal of an ignition timing of an engine ignition device (not shown) and is connected to an input terminal IN1 of the control unit 22 as a reference signal synchronized with the output frequency.

The output voltage of the output winding 25 winded on the stator of the power generator 1 is connected to an alternating output terminal 26, the alternating output terminal 26 is connected to the load 3. The output voltage that is voltage-divided by resistors 27, 28 connected to the output winding 25 is connected to the input terminal IN2 of the control unit 22.

The control unit 22 performs digital sampling on the output voltage input from the input terminal IN2 for one cycle of engine revolution according to a revolution cycle signal of the engine 2 input from the input terminal IN1 to calculate the waveform area and obtain the effective value of the output voltage, and controls increase and decrease of the field current if according to the fluctuation in the effective value to suppress fluctuation in the output voltage. That is, the transistor Q1 is PWM-controlled and the transistor Q2 is controlled to control the current "If" flowing through the field winding 20.

For example, when the load current increases and the output voltage of the output winding 25 lowers, the effective value of the detected output voltage lowers, and the transistors Q1, Q2 operate to increase the field current "If" and raise the output voltage of the output winding 25 so that the effective value becomes closer to the target voltage.

On the other hand, when the load becomes light and the output voltage rises, the effective value increases, and the transistors Q1, Q2 operate to reduce the field current "If" and lower the output voltage to the target voltage. Therefore, the power generator 1 is controlled so that the effective value of the output voltage converges to the target value according to the fluctuation in load.

Figure 3:
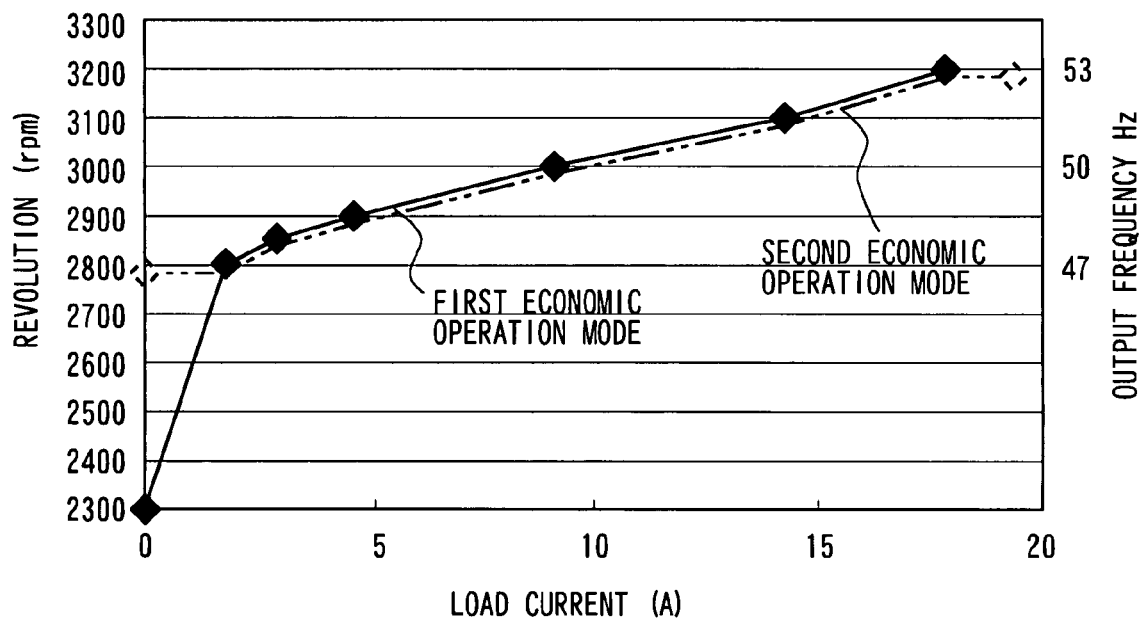
FIG. 3 is a view showing one example of the output characteristic determined by a map showing a relationship between the load current and the target engine revolution.

FIG. 3 is a view showing one example of the output characteristic determined by the map 102. In the figure, the horizontal axis shows the load current and the vertical axis shows the target engine revolution. In this figure, the target engine revolution is set at 2300 rpm when the load current is zero or in time of no load, and the lower limit target engine revolution in time of light load is set to 2800 rpm in the specification when the output frequency is 50 Hz. The upper limit target engine revolution in time of high load is set at 3200 rpm. This means that the revolution is raised until the load current rises to 17.5 ampere.

The values of 2800 rpm and 3200 rpm, which are the lower limit value and the upper limit value for the 50 Hz (3000 rpm) specification, are set in the present example so as to fall within the range of revolution 2790 to 3210 rpm corresponding to ±7% which is the allowable frequency fluctuation defined by the Electric Safety Regulation of Japan, but may be changed according to the country of destination in correspondence to the allowable revolution corresponding to the lower limit value and the upper limit value of the allowable frequency fluctuation width defined in the safety regulation (for example, ISO8528-8) of each country.

Figure 4:
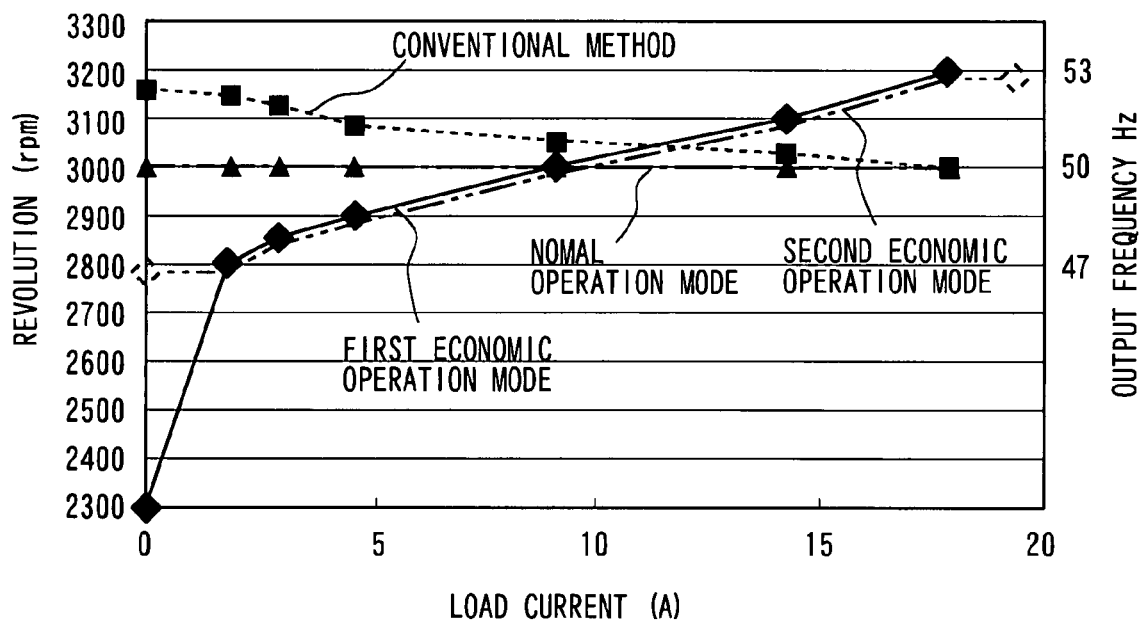
FIG. 4 is a view showing a relationship between the load current and the target engine revolution in the economic operation mode, normal operation mode and conventional method.

FIG. 4 is a view showing, in contrast, the relationship between the load current and the target engine revolution of the conventional mechanical governor type, and the relationship between the load current and the target engine revolution in the normal operation mode and the economic operation mode of the present invention when the output frequency is 50 Hz. In the conventional method, the target engine revolution is determined so as to lower with increase in the load current due to properties of the mechanical governor, whereas the target engine revolution is maintained at 3000 rpm irrespective of the load current in the normal operation mode of the present invention. The economic operation mode is operated within the range of lower limit of 2800 rpm and upper limit of 3200 rpm during the load connected operation, as described in FIG. 3.

The economic operation mode can be divided to a first economic operation mode in which the lower limit value of the target engine rotation number is lowered to 2300 rpm as shown in FIG. 3, and a second economic operation mode in which the lower limit value is determined at 2800 rpm, as shown with a chain line in FIG. 3. One of the first and the second economic operation modes can be selected. The first economic operation mode is suitable for a relatively large load as in compressor, washer and the like, where the no-load operation and the high-load operation are alternately switched frequently. In this case, the revolution is greatly lowered, and the economic operation can be performed in the no-load operation that is performed frequently. On the other hand, the second economic operation mode is suitable for general loads including very small loads since a region where the revolution lowers greatly is not provided unlike the first economic operation mode, whereby the range of change in the revolution is small, fluctuation in operation noise or the like is small, and the output frequency is maintained in a wide region including no-load region.

As can be seen from FIG. 4, the engine revolution can be made low in time of no-load operation or light-load operation according to the economic operation mode of the present embodiment, and thus noise and fuel consumption can be reduced. Furthermore, an output larger than the output in the normal operation mode can be taken out since the engine revolution can be raised within the allowable range in time of high load. Therefore, the engine revolution can be changed within the fluctuation allowable range of the output frequency, and the output corresponding to the load can be obtained by simply switching the switch 9 depending on the type of the load 3.

What is claimed is:

1. An engine-driven power generator configured by an engine and a synchronous power generator driven by the engine; the engine-driven power generator comprising:
    an electronic governor for controlling the revolution of the engine to a target value, the electronic governor including operation modes of a normal operation mode of maintaining the engine revolution substantially constant irrespective of the fluctuation in the load of the power generator, and an economic operation mode of increasing or decreasing the engine revolution within a predetermined allowable range according to the fluctuation in the load of the power generator; and
    switching means for selecting one of either the normal operation mode or the economic operation mode.

2. The engine-driven power generator according to claim 1, further comprising:
    a sensor for detecting load current of the power generator; and
    target value determining means for determining the target value of the engine revolution according to the load current between an upper limit value and a lower limit value set within the predetermined allowable revolution range when the economic operation mode is selected.

3. The engine-driven power generator according to claim 2, wherein one of a plurality of target revolution range is selected in the economic operation mode.

4. The engine-driven power generator according to any one of claim 1, further comprising an automatic voltage regulator for controlling the output voltage substantially constant irrespective of the fluctuation in the load of the power generator.

5. The engine-driven power generator according to any one of claim 2, further comprising an automatic voltage regulator for controlling the output voltage substantially constant irrespective of the fluctuation in the load of the power generator.

6. The engine-driven power generator according to any one of claim 3, further comprising an automatic voltage regulator for controlling the output voltage substantially constant irrespective of the fluctuation in the load of the power generator.

* * * * *